United States Patent [19]

Yoshino

[11] Patent Number: 4,783,791

[45] Date of Patent: Nov. 8, 1988

[54] MULTIPLE REPRODUCING REPEATER STATION SYSTEM

[75] Inventor: Ryozo Yoshino, Hadano, Japan

[73] Assignee: Hitachi, Ltd., Tokyo, Japan

[21] Appl. No.: 38,753

[22] Filed: Apr. 15, 1987

[30] Foreign Application Priority Data

Apr. 16, 1986 [JP] Japan .................................. 61-85907

[51] Int. Cl.⁴ ............................................. H04B 3/36
[52] U.S. Cl. .......................................... 375/3; 375/82
[58] Field of Search ................... 375/3, 4, 80, 82, 58; 370/85, 86, 89, 80; 455/601

[56] References Cited

U.S. PATENT DOCUMENTS

| | | | |
|---|---|---|---|
| 4,438,520 | 3/1984 | Saltzer | 370/89 |
| 4,495,617 | 1/1985 | Ampulski et al. | 370/89 |
| 4,503,533 | 3/1985 | Tobagi et al. | 370/80 |
| 4,587,650 | 5/1986 | Bell | 370/86 |

OTHER PUBLICATIONS

Techinal Committee Computer Communications of IEEE "An American National Standard IEEE Standard for Local Area Network pp. 74–86 & Mar. 19, 1985.

Von Roland Best "Der Elektoniker Nr." 6/1975 pp. 9–16.

Von Roland Best "Der Elektoniker Nr." 8/1975 pp. 13–22.

Von Roland Best "Der Elektoniker Nr" 10/1975 pp. 24–32.

*Primary Examiner*—Robert L. Griffin
*Assistant Examiner*—Stephen Chin
*Attorney, Agent, or Firm*—Antonelli, Terry & Wands

[57] ABSTRACT

A multiple reproducing repeater station system having a plurality of repeater stations connected in tandem. Each of the repeater stations comprises a logical circuit for decoding data from a pulse-modulated signal transmitted from the preceding repeater station and delivering decoded data to a processing circuit, and a PLL for extracting a clock signal from the pulse-modulated signal. The PLL has an operational response time which is so adjusted as to be different from a data delay time due to a logical operation within the logical circuit.

6 Claims, 6 Drawing Sheets

F I G. 4A
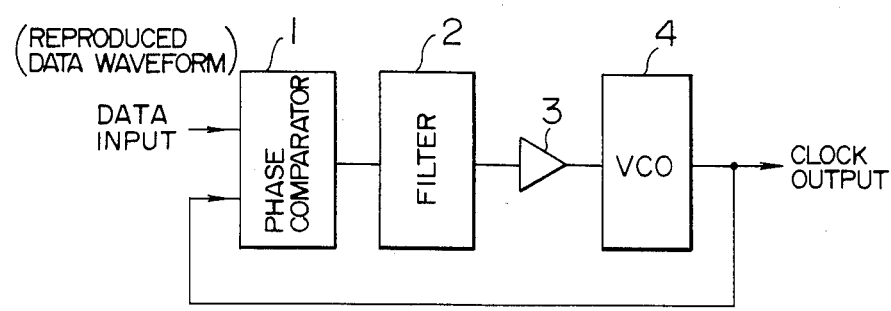
F I G. 4B
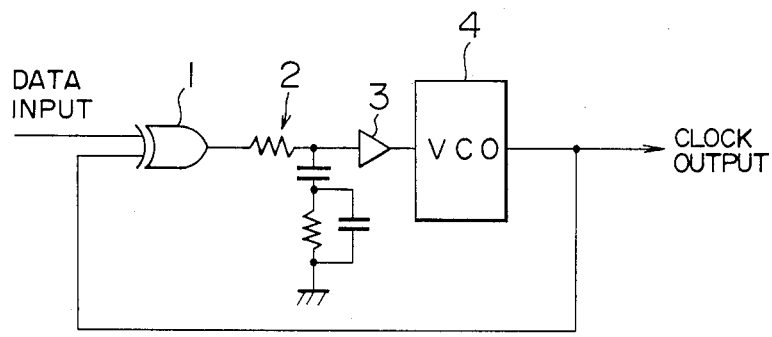

MULTIPLE REPRODUCING REPEATER STATION SYSTEM

BACKGROUND OF THE INVENTION

1. Field of the Invention

This invention relates to a multiple reproducing repeater station system in which individual reproducing repeater stations connected in tandem use a phase locked loop (PLL) and more particularly to an improved multiple reproducing repeater station system which can achieve the combinational effect of reducing the rise time for the response of the system (hereinafter simply referred to as the system rise time) and suppressing jitters in data.

2. Description of the Related Art

The band width of the PLL has conventionally been discussed in, for example, ANSI/IEEE Std. 802,5-1985, pp 80-82. This reference publication determines the PLL band width to be 1% of the bit rate but it in no way takes into consideration a delay in data due to the repeating operation.

More particularly, the prior art reference publication takes no account of the fact that the jitter is accumulated in different ways depending upon a delay in a logical circuit (hereinafter referred to a logic delay) participating in the repeating operation. Especially where the phase-lock time of the PLL and the system rise time are both desired to be decreased in a system having a large logic delay, the problem of the jitter accumulation becomes serious, bringing about inconvenience that constraint is imposed on the number of repeaters used and the reduction in the system rise time is inevitably prevented.

Prolongation of the PLL phase-lock time is equivalent to narrowing the PLL band width and so narrows the capture range of a voltage controlled oscillator (VCO) used in the PLL. Accordingly, a PLL incorporating such a VCO must be particularly highly stable (against temperatures and voltage variations) and becomes costly.

SUMMARY OF THE INVENTION

An object of this invention is to collectively solve the problems encountered in the prior art and to clarify the relation between PLL band width (response time) and data delay time (logic delay) to provide a multiple reproducing repeater station system capable of suppressing the jitter accumulation and reducing the system rise time.

According to the invention, the above ojbect can be accomplished by setting the PLL band width and the data delay due to the logical operation during the repeating operation to values at which less jitter accumulation takes place.

The amount of data delay due to the logical operation during the repeating operation is substantially determined by the type of communications. In case where serial data is transmitted to a single communication line, data representative of an address to be propagated on the communication line is first fetched into the logical circuit of the repeater and thereafter the address is decided. The number of operations for this purpose is increased in proportion to complexity of a protocol, resulting in a tendency to increabbKe the amount of data delay more and more. Since the amount of data delay is fixed for a given communication protocol, the individual repeater stations in the system sequentially transfer data by applying the same amount of delay to the data. By determining the PLL band width in relation to the data delay for each repeater station, a system can be constructed in which the overall jitter accumulation and the system rise time are both decreased.

In the multiple reproducing repeater station system, band-constraint imposed upon the cable interconnecting the repeater stations as well as upon the receiving amplifier circuit brings about an inter-code interference which is responsible for the occurrence of a jitter. Because of localization of the frequency component contained in the data, the jitter takes the form of a stationary phase offset, which is called a pattern jitter. The pattern jitter is maximized when the data repeats itself at a long period, in general, when a set of "1" data and "0" data repeats itself at a long period. The PLL operates so as to follow the phase offset caused by the pattern variation. The follow-speed depends on the PLL band width and where the response time determined by the band width is $\tau$, the peak value of the jitter is delayed by $\tau$ each time it passes through one repeater station. One repeater station delays data by a logic delay and the delayed data is transmitted to the succeeding repeater station, as described previously. Therefore, when the data is delayed by an amount which equals the PLL response time, a maximum of jitter accumulation takes place, leading to an erroneous operation. It is therefore possible to suppress the jitter accumulation and prevent the erroneous operation by setting the PLL response time to a value at which the data delay does not coincide with the PLL response time equivalent to a delay in transfer of jitter peak through one repeater station.

BRIEF DESCRIPTION OF THE DRAWINGS

FIG. 4A is a general schematic diagram of a PLL.

FIG. 4B is a circuit diagram illustrating an example of the PLL.

DESCRIPTION OF THE PREFERRED EMBODIMENTS

The invention will now be described by way of example with reference to the accompanying drawings.

Figure 1A:
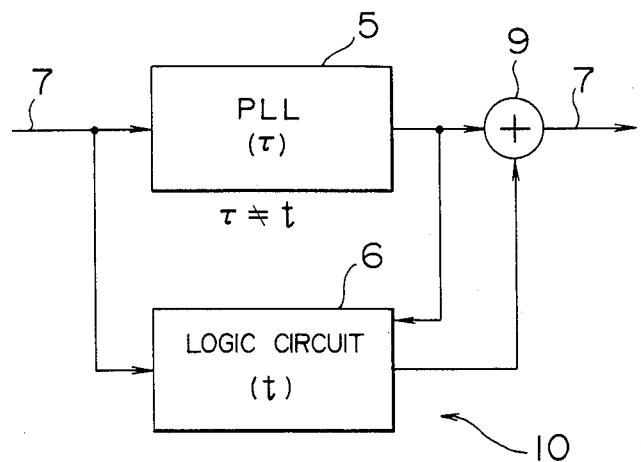
FIG. 1A is a block diagram illustrating a repeater station according to an embodiment of the invention.
Figure 1B:
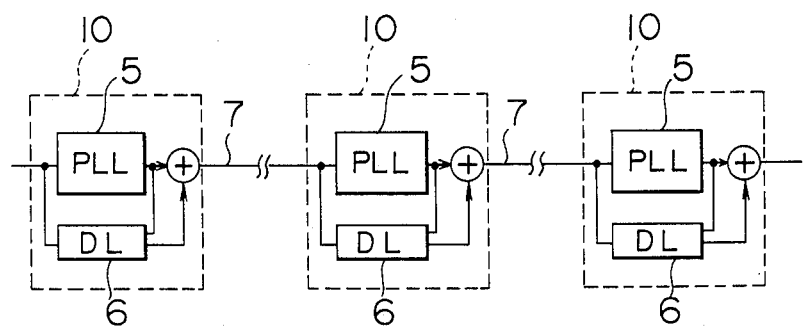
FIG. 1B is a block diagram illustrating a system having a plurality of repeater stations of FIG. 1A connected in tandem.

FIG. 1A illustrates a single repeater station 10, and a plurality of repeater stations 10 are connected in tandem through communication lines 7 as shown in FIG. 1B. Used as the communication line is a coaxial cable, a twisted pair cable, optical fibers or the like.

Each of the repeater stations 10 receives data through the communication line 7. The received data undergoes band-constraint under the influence of the communication line 7 and is distorted as indicated at a received data waveform in FIG. 2. The received data is reproduced by a receiving circuit (now shown) and reproduced data is applied to a PLL 5 and a logical circuit 6. As will be described later with reference to FIG. 4A, the PLL 5 is adapted to extract a clock used for pulse modulation of the reproduced data. The logical circuit 6 responds to the clock from the PLL 5 to decode the reproduced data and effects serial-parallel conversion of decoded data. A processing circuit (not shown) of the repeater stations fetches converted data from the logical circuit. The logical circuit 6 may comprise an input latch. Since the logical circuit 6 relays the decoded data after temporary holding thereof, a delay t is caused within the logical circuit. For transmission to the succeeding repeater station, the decoded data from the logical circuit 6 is modulated, at a data re-phase lock circuit 9, with the clock reproduced by the PLL 5 and is transmitted to the communication line 7. In this embodiment, the operational response time (closed-loop response time) $\tau$ with which the PLL works for the above operation is selected to be unequal to the logic delay time t to thereby suppress the jitter accumulation. As will be described later with reference to FIG. 5, the operational response time $\tau$ of the PLL can be determined by setting a frequency characteristic of the PLL. The logic dalay t within the logical circuit 6 can be determined by setting the time the reproduced data is read out of a holding logic such as a latch included in the logical circuit 6 and then delivered out of the logical circuit 6.

The jitter suppression effect attributable to the unequal PLL operational response time $\tau$ and logic delay t will now be described with reference to FIGS. 2 to 11.

Figure 2:
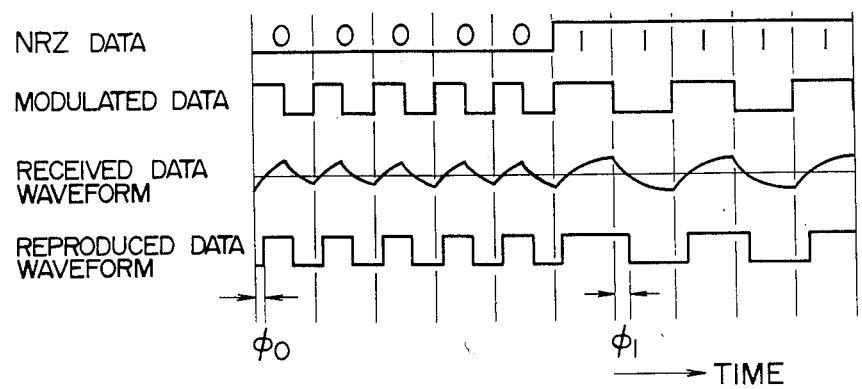
FIG. 2 is a diagram illustrative of the principle of generation of jitters.
Figure 3:
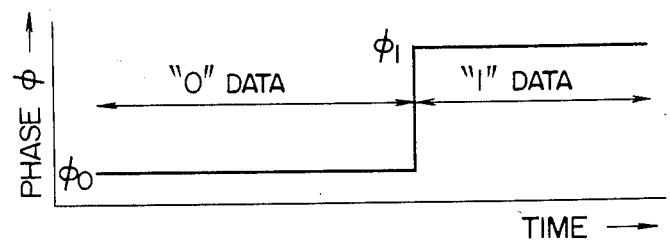
FIG. 3 is a time chart illustrating jitters in terms of phase variations with respect to lapse of time.

FIG. 2 shows the principle of the generation of jitters. Data handled by the processing circuit of the repeater station 10 is of NRZ (Non Return to Zero) but for serial data transmission, the data is modulated so as to contain clock components. The modulated data is transmitted to the remote succeeding repeater station via the communication line 7. The modulated data undegoes band-constraint under the influence of the communication line and is distorted as indicated by the received data waveform in FIG. 2. When the receiving circuit reproduces the thus distorted data, there occurs a phase difference between a phase $\phi_0$ of "0" data and a phase $\phi_1$ of "1" data, as shown in FIG. 3 where the phase $\phi$ on ordinate changes with time on abscissa. More specifically, FIG. 3 shows that when the continuous "0" data changes to the continuous "1" data, the data phase $\phi$ abruptly changes from $\phi_0$ to $\phi_1$.

The circuit in receipt of the data extracts the clock from the reproduced data, samples the reproduced data to demodulate the original NRZ data from the reproduced data, and performs logical operations.

For extraction of the clock, a tank circuit or the PLL is generally used. The present invention particularly uses the PLL for clock extraction and only the PLL for this purpose will be described hereinafter.

Figure 5:
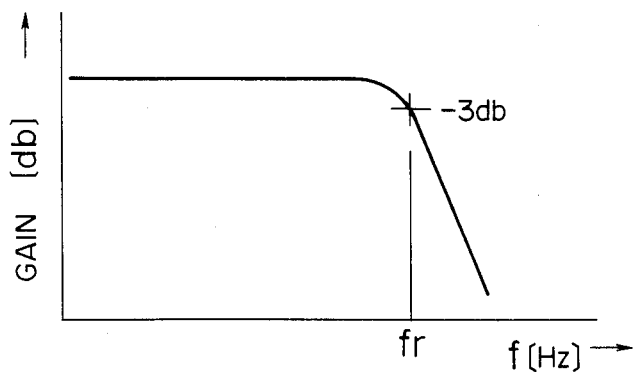
FIG. 5 is a graphic representation of a closed-loop response frequency characteristic of the PLL.

The PLL is generally constructed as illustrated in FIG. 4A, comprising a phase comparator 1, a loop filter 2, an amplifier 3 and a VCO 4. The phase comparator 1 has one input applied with a data input signal of the reproduced data waveform shown in FIG. 2 and the other input applied with a clock output signal from the VCO 4. The phase comparator 1 detects a difference in phase between the two input signals as a pulse width difference which is applied to the loop filter 2. Then, the loop filter 2 converts the pulse width difference into a voltage difference which is amplified by the amplifier 3 and used to control the oscillation frequency of the VCO 4. Through the above operation, the PLL achieves phase matching between the reproduced data waveform of the data input signal and the clock output signal. The operation speed for the PLL to complete the phase matching is determined by a closed loop frequency characteristic of the PLL as shown in FIG. 5. A frequency band defined by a frequency $f_T$ at which the gain of the PLL 3 db decreases is called a closed-loop frequency band. When the PLL has the flat frequency characteristic shown in FIG. 5, the operational response time $\tau$ can be related to $f_T$ by approximation pursuant to equation (1):

$$\tau = \frac{1}{2\pi f_T}. \qquad (1)$$

In order to obtain inequality between logic delay t and PLL operational response time $\tau$, the time constant of the loop filter 2 is adjusted.

FIG. 4B shows a specified example of the PLL. In this example, an exclusive −OR circuit is used as the phase comparator 1 and a CR integrator is used as the loop filter 2. In this PLL, the operational response time can be selected by adjusting the time constant of a CR circuit of the loop filter 2.

Figure 6:
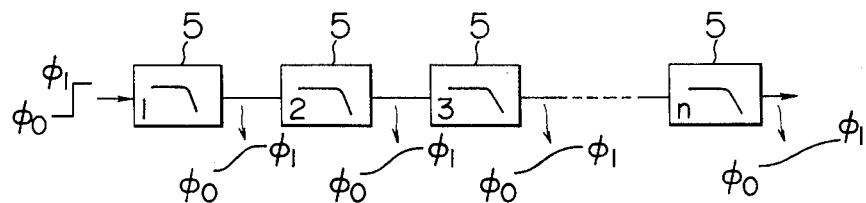
FIG. 6 is a block diagram showing a plurality of PLL stages connected in tandem.
Figure 7:
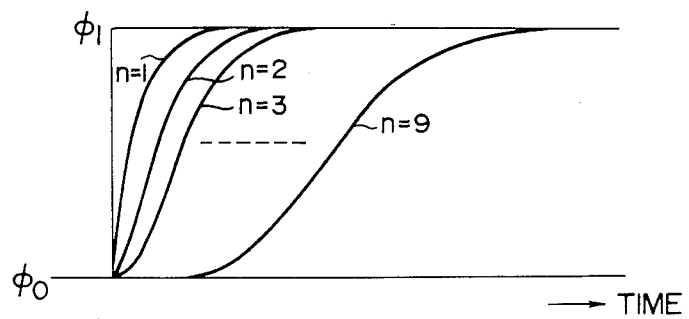
FIG. 7 is a time chart illustrating responses obtained at individual stages when a phase transition is applied to the multiple PLL stage.
Figure 8:
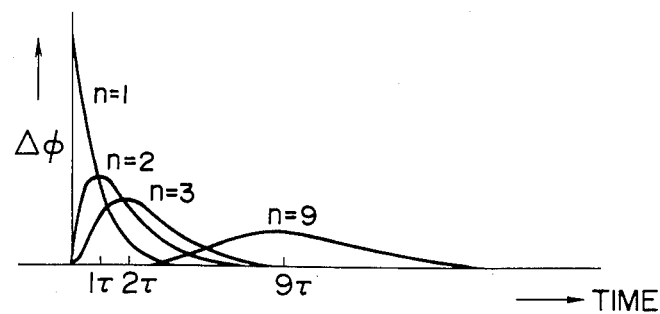
FIG. 8 is a time chart illustrating alignment jitters obtained at individual stages of the multiple PLL stage.
Figure 9:
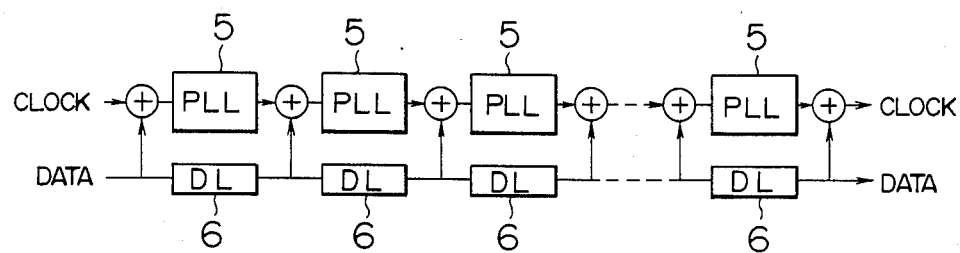
FIG. 9 is a block diagram illustrating a multiple reproducing repeater station system.

A plurality of PLL stages 5 are connected in tandem as illustrated in FIG. 6. Once a phase transition is produced by a change in data within the initial stage, the phase transition is successively transferred to the succeeding stages in such a manner that, as illustrated in FIG. 6, the rate of transition from $\phi_0$ to $\phi_1$ is decreased or the phase transition is unsharpened after passage through each PLL stage. FIG. 7 illustrates a waveform for n=1 representative of a phase transition after passage through the 1st PLL stage, ... and a waveform for n=9 representative of a phase transition after passage through the 9th PLL stage. It will also be appreciated from FIG. 7 that the initial signal inputted first stage is step like phase transition. This delay responsive to the phase transition becomes a phase difference between the data phase and the clock and the phase difference is called an alignment jitter. FIG. 8 shows what form the alignment jitter takes when it is transferred through the plurality of PLL stages connected in tandem. A waveform for n=1 represents a phase difference between data and clock at the 1st PLL stage and a waveform for n=9 represents a phase difference between data and clock at the 9th PLL stage, in relation to lapse of time. While the step-like phase transition from $\phi_0$ to $\phi_1$ applied to the initial stage is successively transferred to the succeeding stages with being subjected to a delay corresponding to the PLL operational response time $\tau$, the amount of jitter, $\Delta\phi$, is gradually decreased. It should be understood that the step-like phase transition applied to the initial stage of the multiple PLL stage is transferred to the succeeding stages in the manner discribed above. In the actual data transmission, however, data from which a phase transition is produced at the initial PLL stage is also sent to the subsequent stage. Since the circuits of the same construction are connected in tandem, the subsequent stage in receipt of the data obviously responds to the data in the same manner as the initial stage. FIG. 9 illustrates a model of a multiple reproducing repeater station system comprised of the FIG. 1B multiple PLL stage by neglecting the modulation transmission to emphasize only the transmission of the clock and (NRZ) data.

Figure 10:
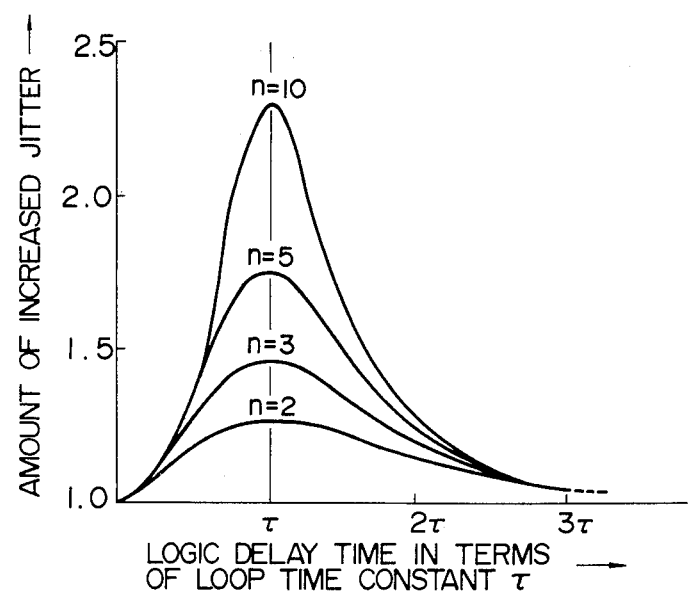
FIG. 10 is a graph showing the relation between the logic delay in terms of the PLL response time and the amount of increased jitter.
Figure 11:
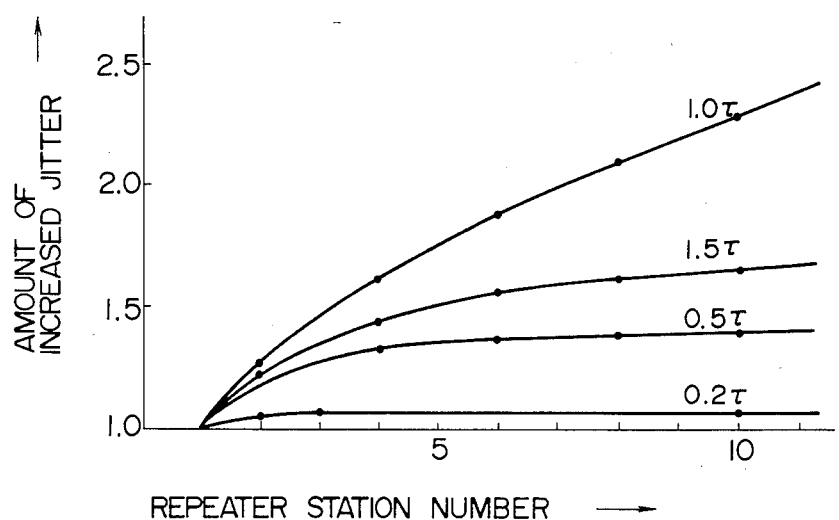
FIG. 11 is a graph showing the relation between the number of repeater stations and the jitter accumulation.

The clock components in the data are sequentially transferred to the succeeding stations through the PLL stages. Because of the reproducing repeating operation, the (NRZ) data is sequentially transferred to the succeeding stations while undergoing logic delays. It should be noted that the clear distinction between the clock and the (NRZ) data as in the model of FIG. 9 is impractical because the data actually transmitted is modulated to contain the clock components, as described previously. Since the jitter applied to the PLL is due to a data pattern variation as has been explained with reference to FIG. 2, the jitter caused by the data pattern variation is applied to the PLL of each station each time the data pass through one station from the data channel to the clock channel, as shown in FIG. 9, and is added to the clock sent from the preceding station. Accordingly, it will be readily gathered from the above description that the jitter due to the data pattern variation is expected to be increasingly accumulated when it passes through the plurality of reproducing repeater stations. FIG. 10 shows the relation between the jitter accumulation and the logic delay time in terms of the PLL response time $\tau$ (loop time constant $\tau$). In FIG. 10, abscissa represents the logic delay time in terms of the PLL loop time constant $\tau$ and ordinate represents the amount of increased jitter. As is clear from FIG. 10, the jitter accumulation is maximized when the logic delay time coincides with the PLL loop time constant $\tau$. FIG. 11 shows the relation between the number of repeater stations on the abscissa and the jitter accumulation on the ordinate by using the logic delay in terms of the loop time constant $\tau$ as parameter. When the logic delay coincides with the loop time constant $\tau$ to measure 1.0 $\tau$ in FIG. 11, the jitter accumulation drastically increases as the number of repeater stations increases. On the otherhand, the jitter accumulation is saturated at a point representative of a logic delay which deviates from 1.0 $\tau$ to measure, for example, 0.5 $\tau$ and about 10 stations. For a logic delay of 0.2 $\tau$, the jitter accumulation is saturated at 3 stations. As is clear from the above, the jitter accumulation can be suppressed by diverting the logic delay from the loop time constant (1.0 $\tau$) to either above or below $\tau$.

In the above embodiment, the logic delay t can be related to the PLL operational response time $\tau$ in each station such that t is set to be either smaller or larger than $\tau$, as necessary.

When long and short logic delay times t are used for different stations, the PLL operational response time $\tau$ may be set to fall between the long and short logic delay times.

Since, according to the invention, the logic delay is set to be different from the PLL response time to suppress the accumulation of jitters due to the data pattern in the multiple reproducing repeater station system, the stable communication state can advantageously be maintained even when the number of stations to be connected in tandem increases.

Further, since the jitter accumulation condition can be known from the relation between the PLL response time and the logic delay, there is no need of unnecessarily prolonging the PLL response time only for the sake of jitter suppression, together with consequent prolongation of the PLL phase-lock time, and the overall rise time of the communication system in the form of the multiple reproducing repeater station system can be reduced.

I claim:

1. A multiple reproducing repeater station system comprising a plurality of repreater stations connected in tandem, each repeater station having a phase locked loop, wherein each of said phase locked loops includes mean for setting an operational response time thereof to be different from a data delay time due to a logical operation during the repeating operation within an associated one of said repeater stations.

2. A multiple reproducing repeater station system according to claim 1 wherein long and short data delay times are used for different repeater stations and the phase locked loop operational response time is set to fall between the long and short data delay times.

3. A multiple reproducing repeater station system comprising a plurality of repeater stations connected in tandem, each repeater station having a phase locked loop, wherein each of said repeater stations comprises:
   a logical circuit for decoding data from a pulse-modulated signal transmitted from the preceding repeater station and delivering decoded data after temporary holding thereof;
   a phase locked loop for extracting a clock from said pulse-modulated signal, said phase locked loop having an operational response time which is set to be different from a hold time of said logical circuit; and
   a modulation circuit for modulating an output signal from said logical circuit with said clock generated from said phase locked loop and delivering a modulated signal to the subsequent repeater station.

4. a multiple reproducing repeater station system according to claim 3 wherein said phase locked loop operational response time is set to be greater than twice said hold time of said logical circuit.

5. A multiple reproducing repeater station system according to claim 3 wherein said phase locked loop operational response time is set to be greater than five times said hold time of said logical circuit.

6. A multiple reproducing repeater station system according to claim 3 wherein said phase locked loop operational response time is set to be less than $\frac{2}{3}$ of said hold time of said logical circuit.

* * * * *